United States Patent [19]
Magnusson et al.

[11] Patent Number: 5,448,439
[45] Date of Patent: Sep. 5, 1995

[54] ROTARY HEAD AND CYLINDRICAL DRUM TAPE GUIDE ASSEMBLY FOR TAPE RECORD AND REPRODUCE APPARATUS

[75] Inventors: Steven L. Magnusson, Redwood City; Abraham Eshel, Mountain View, both of Calif.

[73] Assignee: Ampex Corporation, Redwood City, Calif.

[21] Appl. No.: 908,283

[22] Filed: Jul. 1, 1992

Related U.S. Application Data

[63] Continuation-in-part of PCT/US92/05144, Jun. 18, 1992, and continuation-in-part of Ser. No. 717,138, Jun. 18, 1991, abandoned.

[51] Int. Cl.⁶ ............................................. G11B 15/61
[52] U.S. Cl. .................... 360/130.24; 360/84; 360/107
[58] Field of Search .................. 360/130.22, 130.23, 360/130.24, 104, 107, 109, 84, 85, 95

[56] References Cited

U.S. PATENT DOCUMENTS

| | | | |
|---|---|---|---|
| 3,661,311 | 5/1972 | Warren | 226/198 |
| 4,048,661 | 9/1977 | Starr | 360/85 |
| 4,163,266 | 7/1979 | Tamaura et al. | 360/84 |
| 4,199,796 | 4/1980 | Videc | 360/130.22 |
| 4,249,222 | 2/1981 | Iwasaki | 360/130.23 |
| 4,709,289 | 11/1987 | Kim | 360/130.24 |
| 4,719,528 | 1/1988 | Sato | 360/130.24 |
| 4,725,910 | 2/1988 | Kaku et al. | 360/104 |
| 4,761,696 | 8/1988 | Muller et al. | 360/84 |
| 4,833,562 | 5/1989 | Kochi et al. | 360/130.24 |
| 4,977,473 | 12/1990 | Arai et al. | 360/130.24 |
| 5,008,769 | 4/1991 | Kaneko et al. | 360/130.24 |

FOREIGN PATENT DOCUMENTS

| | | | |
|---|---|---|---|
| 154120 | 9/1985 | European Pat. Off. | 360/130.24 |
| 0395193 | 10/1990 | European Pat. Off. | |
| 52-28306 | 3/1977 | Japan | 360/130.24 |
| 5972669 | 4/1984 | Japan | |
| 60-50737 | 3/1985 | Japan | |
| 130051 | of 1987 | Japan | |
| 62-67761 | 3/1987 | Japan | 360/130.24 |
| 62-291714 | 12/1987 | Japan | |
| 62-291715 | 12/1987 | Japan | |
| 62-295209 | 12/1987 | Japan | |
| 62-295210 | 12/1987 | Japan | |
| 1109565 | 4/1989 | Japan | |
| 02152060 | 6/1990 | Japan | 360/130.24 |
| 2169433 | 7/1986 | United Kingdom | |

OTHER PUBLICATIONS

A. Eshel, "Simulation Of Head Contour Effects In Helical Scan Video Recording", *Tribology Transactions*, V34, No. 4, Oct. 1991, pp. 573–576.

F. R. Freeman, et al., "Apparatus For Lifting Tape Edges Above Path Of Rotating Head", U.S. Defensive Publication No. T941,022.

*Primary Examiner*—Stuart S. Levy
*Assistant Examiner*—Paul J. Ditmyer
*Attorney, Agent, or Firm*—John G. Mesaros

[57] ABSTRACT

A rotary head helical scan tape record and/or reproduce apparatus has an upper rotatable cylindrical drum tape guide section and a stationary lower cylindrical drum tape guide section that includes a narrow upper ridge which is displaced radially from the axis of the stationary cylindrical drum tape guide section in a direction towards the location where the rotary head ends the scan of the tape. Magnetic tape is transported in a helical path from the lower stationary drum guide section, over the radially displaced upper ridge to the upper rotatable drum guide section, which carries the record and/or reproduce heads that transfer signals to and from the tape.

28 Claims, 5 Drawing Sheets

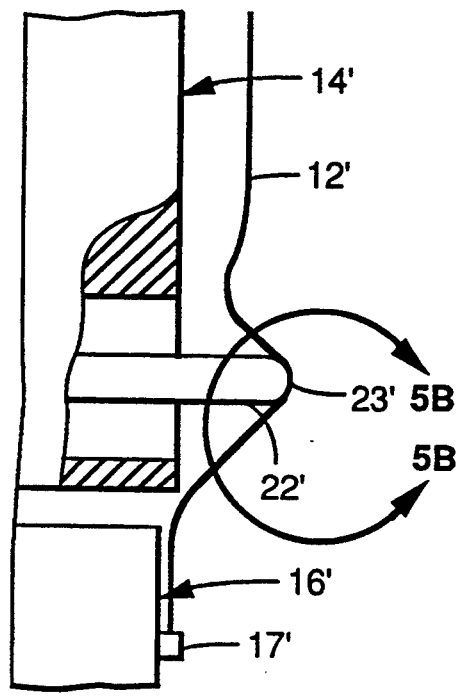
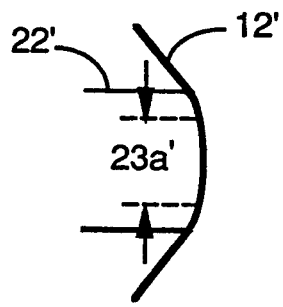
FIG. 5A (PRIOR ART)
FIG. 5B (PRIOR ART)
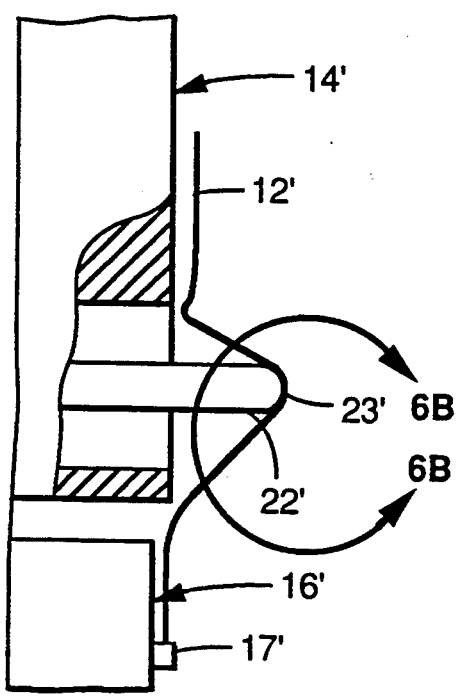
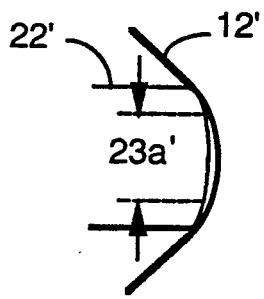
FIG. 6A (PRIOR ART)
FIG. 6B (PRIOR ART)

ROTARY HEAD AND CYLINDRICAL DRUM TAPE GUIDE ASSEMBLY FOR TAPE RECORD AND REPRODUCE APPARATUS

REFERENCE TO PRIOR APPLICATION

This is a continuation-in-part application of International Application Ser. No. PCT/US 92/05144, filed Jun. 18, 1992 and of U.S. application Ser. No. 07/717,138, filed on Jun. 18, 1991, now abandoned.

BACKGROUND OF THE INVENTION

This invention relates generally to magnetic tape record and/or reproduce apparatus and more particularly to a structure providing an improved head-to-tape interface in helical scan rotary magnetic head and cylindrical tape guide assemblies used, for example, in wideband video and data tape record and/or reproduce apparatus.

The rotary head segmented scan wideband tape record and/or reproduce apparatus is an exceedingly complex assembly. In helical scan tape record and/or reproduce apparatus of this kind, information is recorded on and reproduced from a magnetic tape by one or more magnetic heads rotated at a high velocity relative to the tape, which is transported at a much lower velocity along a helical path defined by a cylindrical drum tape guide structure. The heads and cylindrical drum tape guide structure usually are an assembly commonly referred to as a scanning assembly, or simply a scanner. The information is recorded on the tape in discrete parallel tracks that diagonally extend along the tape at an angle, typically of a few degrees relative to the length of the tape, so that the length of a recorded track greatly exceeds the tape width.

Rotary head helical scan tape record and/or reproduce apparatus employ a variety of different tape handling apparatus, rotary head handling apparatus and tape guide apparatus. Some use a single head to record and/or reproduce information relative to the tracks on the tape, while others use a plurality of two or more heads to do so. Regardless of the number of heads, usually they are mounted to rotate in a circular path as information is transferred in respect of the tape. The cylindrical drum tape guide structure is commonly formed of two axially displaced cylindrical drum sections. In a widely used helical scan rotary magnetic head and cylindrical tape guide assembly, the upper drum is mounted for rotation and the lower drum is mounted stationary, with the record and/or reproduce heads mounted to the upper rotatable drum to be rotated thereby. Other helical scan rotary magnetic head and cylindrical tape guide assemblies have stationary upper and lower drum sections, with the rotary heads mounted to a separate rotatable structure, such as a disk or third drum section, for rotation between the stationary upper and lower drum sections.

In helical scan tape record and/or reproduce apparatus, two recognized alternatives of guiding the tape helically about the cylindrical drum tape guide structure are commonly used, which are generally referred to as the "alpha" and the "omega" wrap apparatus. In the alpha wrap apparatus, the tape is introduced to the helical path about a cylindrical drum tape guide structure for scanning by a rotary head from one direction relative to the drum guide and is wrapped completely around the drum so that it exists in the opposite direction relative to the drum guide. It is referred to as alpha wrap apparatus for the reason that the helical tape path about the cylindrical drum tape guide structure generally conforms to the Greek symbol alpha when one views the tape path about the cylindrical drum in a direction along the axis of the cylindrical drum. In omega wrap apparatus, the tape is introduced to the helical path about the cylindrical drum tape guide structure along a path extending towards the drum in a direction generally radial to the cylindrical drum, passes around an entrance guide that directs the tape onto the surface of the drum, helically extends about the drum, and passes around an exit guide to be directed thereby away from the drum in a direction generally radial thereto. The tape path about the cylindrical drum tape guide generally conforms to the shape of the Greek symbol omega when it is viewed in a direction extending along the axis of the cylindrical drum.

In all of these helical scan magnetic tape record and/or reproduce apparatus, the tape is directed about the cylindrical drum tape guide along a helical path, with the tape exiting the path about the drum tape guide at a different position axially displaced along the drum surface relative to its position of entry to the path. In some of these apparatus, the tape follows a full-wrap helical path about the cylindrical drum tape guide of near 360°. In other of these apparatus, the tape follows a path of much less than 360°, a common path being near 180° called "half-wrap". These helical scan magnetic tape record and/or reproduce apparatus have provided a practical means of achieving the high head-to-tape speeds necessary for recording and reproducing wideband data, such as television video information.

The parameter of the rotary head helical scan tape record and/or reproduce apparatus critical to high quality wideband signal transfers is the head-to-tape interface. This is particularly so in such apparatus for tape record formats having narrow tracks of recorded information, either with narrow or no record-free space or guard bands between them, recorded and reproduced at high relative head-to-tape speeds, such as in digital video tape record and/or reproduce apparatus constructed according to either of the well known D-1 or D-2 formats. The head-to-tape interface is determined to a considerable extent by the point of contact between the head and the tape, which must be of an optimum configuration for optimum signal transfers. Optimum head-to-tape interface is achieved by establishing a perfectly uniform and symmetric head tip penetration relative to the tape surface over the entire scan of the tape by the head, while the tape is guided accurately and stably about the cylindrical drum tape guide structure. More particularly, the tip of the head where signal transfers occur must engage the tape in a manner which maintains a consistent degree of tip penetration relative to the tape along the entire scan of tape to optimize the quality of the signal transfer. Unfortunately, the dynamics of guiding flexible tape about a cylindrical tape guide and rotating a head in contact with the guided flexible tape have prevented achieving perfectly uniform and symmetric head tip penetration along the entire scan of the tape.

As is known, in rotary head helical scan tape record and/or reproduce apparatus the head tip engages the tape such that a slight lift or "tent" is created in the tape at the point of contact with the head tip that displaces the tape from the surface of the cylindrical drum tape guide structure. It is desirable to support the tape at the head tip so that the profile of the tent remains uniform and symmetrical at the head tip throughout the scan of the tape by the head and so that the head tip engages the tent of the tape throughout the scan of the tape by the head. Too much lift or "tenting," such that the apex of the tape tent remains away from the portion of the tip of the head where signal transfers occur, results in a loss of signal output to or from the head, and a concomitant drop in the output signal-to-noise ratio (S/N). Changes in the configuration of the tent at the head tip also leads to a loss in signal output and drop in output signal-to-noise ratio.

Typically, rotary head helical scan tape record and/or reproduce apparatus are arranged to generate an air film or bearing between the surface of the cylindrical drum tape guide structure and the tape, which supports the tape off the surface of the tape guide to facilitate the control of the transport of the tape about the tape guide. In the more common rotary head helical scan tape record and/or reproduce apparatus, the air film is created by an arrangement of upper rotating and lower stationary cylindrical drum tape guide sections. The upper rotating drum section generates an air flow which is drawn between the surfaces of the two drum sections and the tape transported thereabout to form the air film that supports the tape over the surface of the tape guide structure. If the thickness of the air film is uniform across the width of the tape and over the length of tape supported over the surface of the tape guide, a uniform space is maintained between the tape and the surface of the tape guide. With such an air film, the tape tent profile will be uniform and symmetrical at the head tip throughout the head scan with the head tip engaging the tent in the desired manner.

In practice, however, an air film of perfectly uniform thickness is not maintained throughout the head scan. Commonly, the air film between the cylindrical drum tape guide structure and the tape in the region near the location where the head enters or begins the scan of the tape is thicker than it is in the region near the location where the head exits or ends the scan of the tape. This non-uniformity of air film thickness is caused principally by the loss of air from the air film established between the tape and surface of the cylindrical drum tape guide structure. Several other factors can lead to a non-uniform air film thickness, such as variations in tape tension, variations in pressure at the gap between the axially displaced sections of the cylindrical drum tape guide structure and at the windows provided in the tape guide structure for the magnetic heads, and variation in the distance from the head to the tape edge over the scan of the tape by the head.

Such variations singly or in combination contribute to changes in the degree of tip penetration relative to the tape as the head scans the tape, which results in an undesirable non-uniform tape tent profile. The composite tape tent profile obtained over the scan of the tape has a relatively thick air film and consequent low head tip penetration in the region near the location where the head enters the scan of the tape and a relatively thin air film and consequently greater head tip penetration in the region near the location where the head exits the scan of the tape. This variation in the thickness of the air film and concomitant variation in head tip penetration results in changes in the contour of the tape tent profile at the head-to-tape interface, which contribute significantly to losses in signal output and degradation of signal-to-noise ratio.

While a high degree of head tip penetration consistency has been less important in helical scan tape record and/or reproduce apparatus designed for analog signals, the newer helical scan tape record and/or reproduce apparatus designed for digital signals require higher data transfer rates and relative head-to-tape speeds to record more data per unit area of tape, and use thinner tapes for storage of more data on a reel of tape. With relatively thick tapes, moderate tape speed and slow head rotation speeds found in properly designed record and/or reproduce apparatus for analog signals, there is no detrimental deterioration in signal output and degradation of signal-to-noise ratio due to the presence of the typical variation in the thickness of the air film and resultant variation in head tip penetration that alters the contour of the tape tent profile at the head-to-tape interface. Moreover, after a "wear-in" period for the head and tape, it is found that the signal output for such record and/or reproduce apparatus actually improve for the "used" tape. There is, however, no corresponding resultant improvement experienced with the thinner tapes and the newer, faster record and/or reproduce apparatus designed for digital signals, such as digital video tape recorders constructed according to either of the well known D-1 or D-2 formats. While "wear-in" still occurs in these newer, faster record and/or reproduce apparatus, the resultant change in tip penetration relative to the position of the head in the scan of the tape can produce over time a tapered decreasing signal output level along a scan of the tape from a maximum signal level at the head scan position near the location where the head enters the scan of the tape to a minimum at the head scan position near the location where the head exits the scan of the tape.

To achieve a more uniform and symmetric head tip penetration relative to the tape surface over the entire scan of the tape by the head, while the tape is guided accurately and with stability about the cylindrical drum tape guide structure, some rotary head helical scan tape record and/or reproduce apparatus have employed a magnetic head and cylindrical tape guide assembly having non-coaxial stationary and rotatable cylindrical drum tape guide sections, with the axis of the stationary section displaced a small amount relative to the axis of rotation of the rotatable section in a direction towards the location where the head exits the scan of the tape. For the precise tape guidance required in aforedescribed record and/or reproduce apparatus for digital signals, however, it has not been possible to displace the stationary guide section a sufficient amount to remove all undesirable tapered decreasing signal output level without losing stability of tape guidance about the cylindrical drum tape guide structure. When the displacement of the stationary guide section becomes too large, the radial distance to the tape extending about the stationary guide section becomes larger than the radial distance to the tape extending about the rotatable section over a substantial length of the scan of the tape by the head. This creates forces that act on the tape as it is transported about the cylindrical drum tape guide structure, which drive the tape axially along the tape guide away from the tape edge guiding elements commonly provided on the stationary cylindrical drum tape guide section.

There exists, therefore, a significant need for a helical scan rotary magnetic head and cylindrical tape guide assembly which establishes a more uniform and symmetric head tip penetration relative to the tape surface over the entire scan of the tape by the head without risking the loss of stability and accuracy of tape guidance about the cylindrical tape guide. The present invention fulfills these needs and provides further related advantages.

SUMMARY OF THE INVENTION

In accordance with the present invention, a helical scan rotary magnetic head and cylindrical tape guide assembly of a kind having a magnetic head mounted for rotation juxtaposed a stationary cylindrical drum tape guide is provided having a structure for improving the head-to-tape interface. The stationary cylindrical drum tape guide is constructed to have at least two non-coaxial cylindrical segments, each defining a cylindrical surface about a central axis. The segment closest to the juxtaposed rotary magnetic head has its axis displaced radially relative to the axis of the other segment (or segments) a small amount, which in preferred embodiments is generally towards the location where the rotary head exits or ends the scan of the tape, and extends along its axis for a length which is smaller than the length of the other non-coaxial cylindrical segment (or segments) of the stationary tape guide section. Hence, the radially displaced or offset segment has its cylindrical surface displaced radially outward from the axis of rotation of the head a distance that is greater at one location about the scan of the tape by the rotary head than elsewhere about the locus of rotation of the head. As previously described, the air film established between the cylindrical drum tape guide structure and the tape helically transported about the guide is normally thicker in the region where the head enters or begins the scan of the tape and gradually decreases to its thinnest dimension in the region where the head exits the scan of the tape. The drum segment acts locally near the tip of the rotary head as the head scans the tape to aid in supporting the tape where of the air film thickness decreases at a greater elevation above the cylindrical drum tape guide than the air film would do alone. In accordance with the present invention, however, the amount and direction of the radial displacement or offset of the axes of the smaller drum segments and the relative axial lengths of the smaller drum segments are selected to maintain, at least locally near the tip of the rotary head, an average depth of head penetration relative to the tape that is generally uniform at least where the head enters and exits the scan of the tape and at the midpoint of the head's scan of the tape. Moreover, these parameters are selected to maintain the desired downward force on the tape as it is transported about the cylindrical drum tape guide structure to bias the tape against the tape edge guide elements typically provided on the cylindrical drum tape guide.

In one preferred embodiment, the stationary cylindrical tape guide section is also displaced radially or offset relative to the axis of head rotation in a direction to counteract any unwanted tape guiding instability introduced by the radial displacement or offset of the cylindrical drum segment juxtaposed the rotary magnetic head. This offset further enhances the guiding of the tape about the cylindrical drum tape guide structure by contributing to the maintenance of the downward force on the tape that biases it against the tape edge guide elements.

Other features and advantages of the present invention will become apparent from the following detailed description, taken in conjunction with the accompanying drawings, which illustrate, by way of example, the principles of the invention.

BRIEF DESCRIPTION OF THE DRAWINGS

FIG. 5A is a vertical section of the prior art assembly of FIG. 3 taken at a location near the midpoint 21' of the head's scan of the tape 12' helically transported about the assembly 10';

FIG. 5B is an expanded view of the head and tape of FIG. 5A at the location circumscribed by the line 5B—5B;

FIG. 6A is a vertical section of the prior art assembly of FIG. 3A taken at a location near the point 28' where the head exits the scan of the tape 12' helically transported about the assembly 10';

FIG. 6B is an expanded view of the head and tape of FIG. 6A at the location circumscribed by the line 6B—6B;

DETAILED DESCRIPTION

Figure 1:
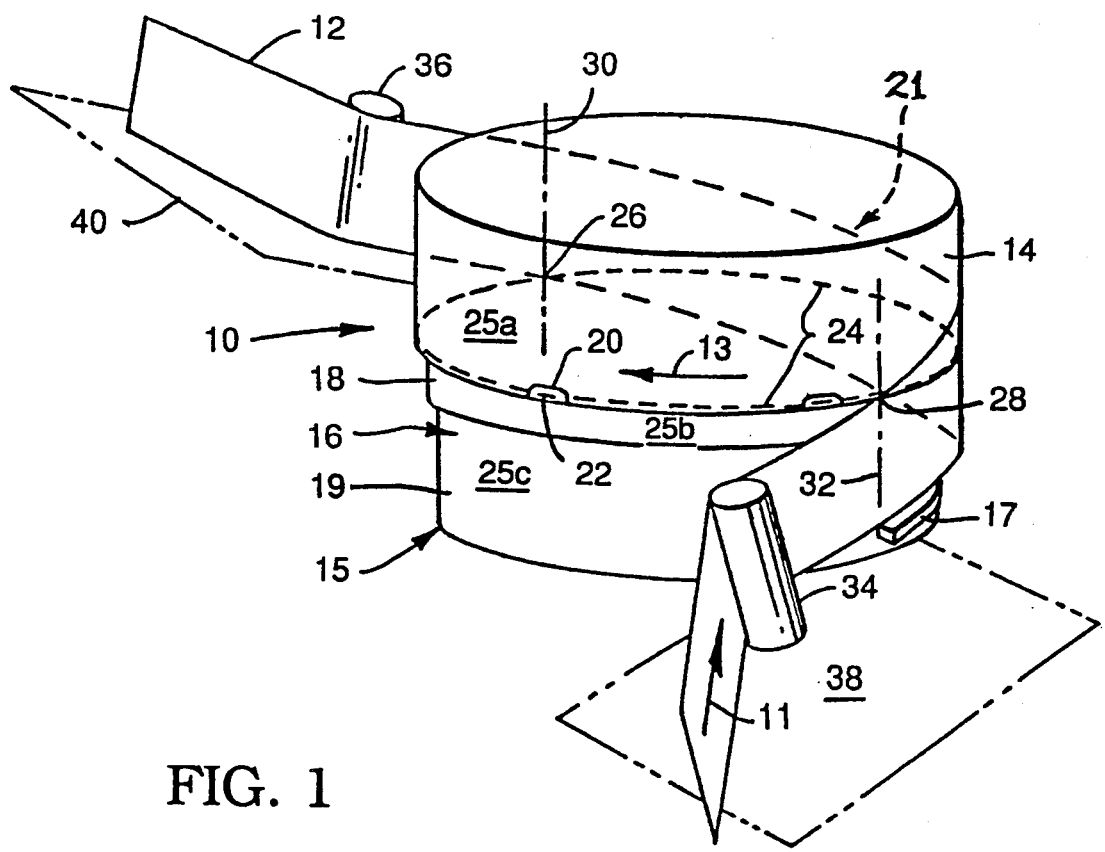
FIG. 1 is a front perspective view of a preferred embodiment of the helical scan rotary magnetic head and cylindrical tape guide assembly of the present invention.

In the following description of embodiments of the present invention, like elements will be designated by like reference numerals, and the description of similar elements may not be repeated with reference to subsequent drawing figures related to the various embodiments of the invention.

Broadly stated, the present invention is directed to a rotary magnetic head and cylindrical tape guide assembly for helical scan magnetic tape record and/or reproduce apparatus for transferring information signals with respect to a magnetic tape record medium, which includes a cylindrical drum tape guide structure that includes a stationary cylindrical tape guide section of a design that establishes a head-to-tape interface that provides throughout the scan of the tape by the head a more uniform tip penetration of the rotary magnetic head with respect to the magnetic tape guided over the surface of the cylindrical drum tape guide structure in the proximity of the rotary magnetic head. The rotary magnetic head and cylindrical tape guide assembly can take various forms, which determine the particular design of the stationary cylindrical tape guide section needed to establish the more uniform relative heads tip penetration that provides the desired head-to-tape interface As well be appreciated from the foregoing and the following detailed description of preferred embodiments of the present invention, the apparatus of the present invention can be implemented in record and/or reproduce arrangements employing either alpha or omega wrap tape guiding configurations and utilizing either full-wrap or half-wrap arrangements. Furthermore, the apparatus of the present invention is adaptable to any helical scan rotary magnetic head and cylindrical tape guide assembly having a stationary cylindrical drum tape guide located proximate the rotary magnetic head, such as those previously described herein, whether the rotary magnetic head is supported by rotatable cylindrical drum tape guide or independent of the cylindrical drum tape guide structure. Moreover, it should also be understood that the apparatus of the present invention is adaptable to helical scan magnetic tape record and/or reproduce arrangements having one or more rotary heads, and in which the rotary heads are rotatable in either rotational direction, the tape is introduced into the helical path about the rotating heads either above or below the exit point and the tape is transported about the helical path in either direction. The relationships of head rotation, tape transport direction and manner of tape guiding relative to the helical path represents a variety of different configurational relationships of which only one will be specifically described herein.

Figure 2:
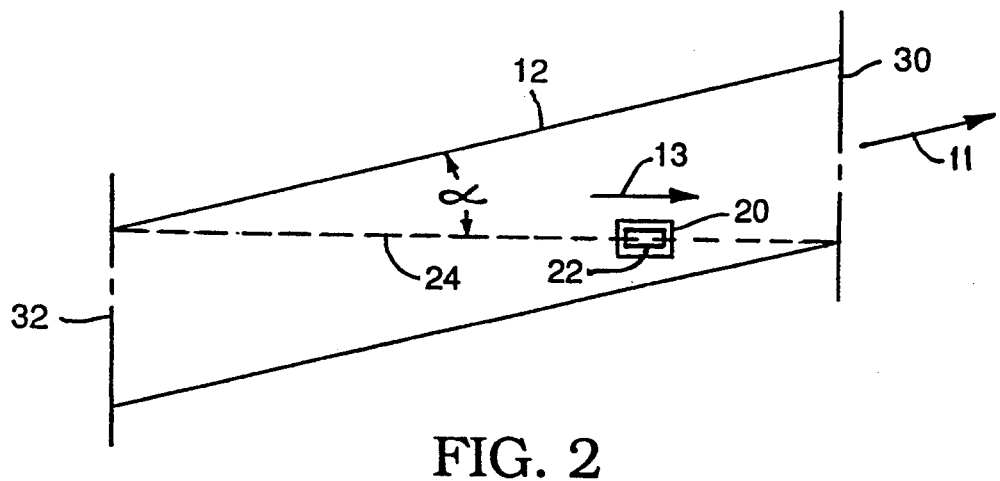
FIG. 2 is a schematic view of the portion of the tape helically wrapped about assembly of FIG. 1.
Figure 3:
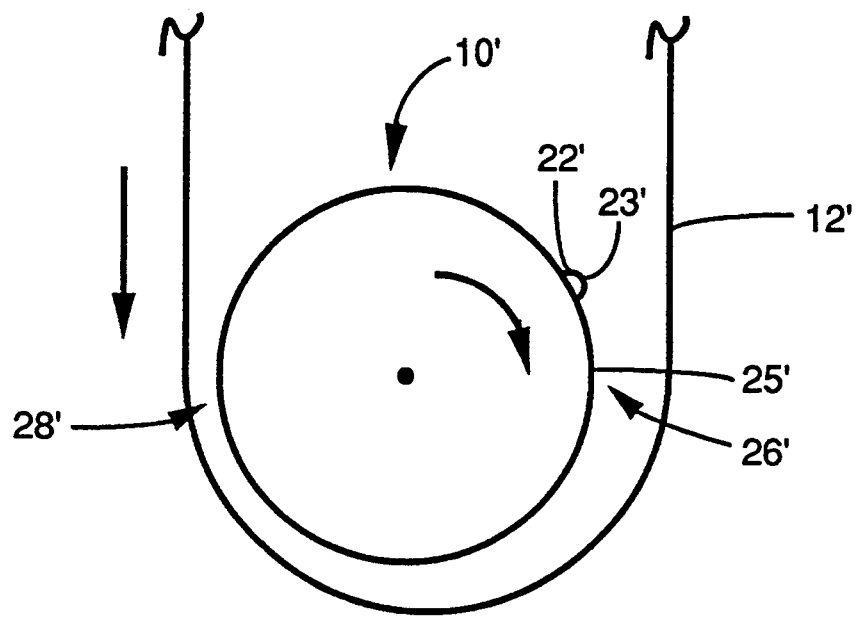
FIG. 3 is a top plan view of a prior art helical scan rotary magnetic head and cylindrical tape guide assembly, illustrating the typical separation between the tape 12' and the surface 25' of the assembly 10' in an exaggerated depiction for sake clarity.

In general, and with reference to FIG. 1, a rotary magnetic head and cylindrical tape guide assembly 10 for transferring information signals with respect to a magnetic tape record medium 12 in accordance with the present invention includes a rotary magnetic head 22 disposed for magnetic coupling with the tape record medium 12 transported in a helical path about a cylindrical drum tape guide structure 15, as information signals are transferred between the head and the tape. The preferred embodiments described herein are in the form of omega half-wrap tape guiding configurations, such as employed in rotary head helical scan tape record and/or reproduce apparatus constructed according to the well known D-2 format. In normal record and/or reproduce operations of such configurations, the tape 12 is introduced to the helical path about the cylindrical drum tape guide structure 15 along a path extending towards the drum guide 15 in a forward direction of tape transport indicated by arrow 11 that is generally radial to the cylindrical drum tape guide, is directed therefrom onto the cylindrical surface 25a, 25b, 25c defined by the drum guide 15 by an entrance guide 34, is guided usually by a tape edge guide 17 helically about the drum guide 15, and is directed away from the drum guide 15 by an exit guide 36 in a direction generally radial thereto. The entrance and exit guides 34 and 36 together with the tape edge guide 17 form the tape guide members that define the helical path about the cylindrical drum tape guide structure 15. In the described embodiments, the tape enters the helical path about the cylindrical drum tape guide surface 25a, 25b, 25c at a location axially displaced along the drum surface below the location where the tape exits the helical path, and the rotary heads 22 rotate in a direction indicated by arrow 13 opposite the normal forward direction 11 of transport of the tape 12 about the cylindrical drum tape guide 15. The heads 22 record and/or reproduce information signals relative to discrete parallel tracks 24 that diagonally extend along the tape at an angle, α, (FIG. 2) relative to the longitudinal direction of the tape. For a given helical scan magnetic tape record and reproduce apparatus construction, the angular orientation of the recorded tracks is a function of the velocity of transport of the tape about the cylindrical drum tape guide, the speed of rotation of the rotary head and the direction of tape transport about the drum guide relative to the direction of rotation of the rotary head, as well as the angle relative to the plane of rotation of the rotary head where the tape enters the helical path about the cylindrical drum tape guide. The angle at which the tape 12 enters the helical path, the direction 11 of tape transport about the cylindrical drum tape guide structure 15, the direction 13 of head rotation and the relative head-to-tape speed determine the length of the tape 12 occupied by each recorded track and the spacing or pitch between adjacent tracks.

In most helical scan magnetic tape record and reproduce apparatus, including the preferred embodiments described herein, the rotary head 99 is carried by the cylindrical drum tape guide structure 15, which in turn is formed by two axially displaced cylindrical sections 14 and 16, one of which (usually the upper most section 14) rotates while the other section 16 remains stationary. Typically, the heads are secured to the upper rotatable cylindrical drum tape guide section 14 to project through scanner windows 20 provided in the rotatable drum section to permit the rotary heads to engage the tape as it is helically transported about the helical scan rotary magnetic head and cylindrical tape guide assembly 10. In rotary head helical scan tape record and/or reproduce apparatus employing such tape guide assemblies, the heads scan from the bottom of tape 12 toward the top, i.e., the scan begins where the tape 12 exits the helical path about the cylindrical tape guide assembly 10 over the upper drum 14 and ends where the tape 12 enters the helical path about the cylindrical drum tape guide assembly over the lower stationary drum 16. The resulting track 24 that a head 22 scans along the tape 12 is shown in a dashed line in FIGS. 1 and 2, starting at the head entry point 26 (the intersection of the scanned track 24 with the tape exit tangent line 30) and extending to the head exit point 28 (the intersection of scanned track 24 with the tape entry tangent line 32). The tape 12 is guided onto and off of the cylindrical drum tape guide assembly 10 by means of an entry guidepin 34 and an exit guidepin 36, both mounted to a stationary support plate (not shown) that also supports the scanner 10. The plane from which the tape enters the helical path about the drum assembly 10 is identified by numeral 38, while the plane onto which the tape leaves or exits the helical path is identified by numeral 40.

As the tape 12 moves along the helical path about the cylindrical drum tape guide assembly 10, the upper drum tape guide section 14 rotates counter to the movement of tape 12 so that the heads 22 carried by the rotating drum 14 scan the tape to record and/or reproduce information in respect of tracks along the tape. As described hereinbefore, the relative movement of tape 12 and heads 22 carried by the upper drum section 14 serves to generate a hydrodynamic air film between the tape 12 and the cylindrical surfaces 25a, 25b and 25c defined by the cylindrical drum tape guide sections 14 and 16 forming the cylindrical drum tape guide structure 15. The hydrodynamic air film supports the tape 12 spaced from and over the cylindrical surface defined by the cylindrical drum tape guide assembly 10.

An exemplary prior art cylindrical drum tape guide assembly 10' of this type is illustrated in FIGS. 3–6, but without the offset drum segments 18 and 19 forming the drum section 16. As previously described, prior art cylindrical drum tape guide assemblies of this type create air films of non-uniform and unsymmetrical thickness between the tape 12' and the cylindrical surface 25' of the drum guide assembly 10', with the thickest air film at the head entry point 26'. The thinnest air film occurs at the head exit point 28'.

Figure 4A:
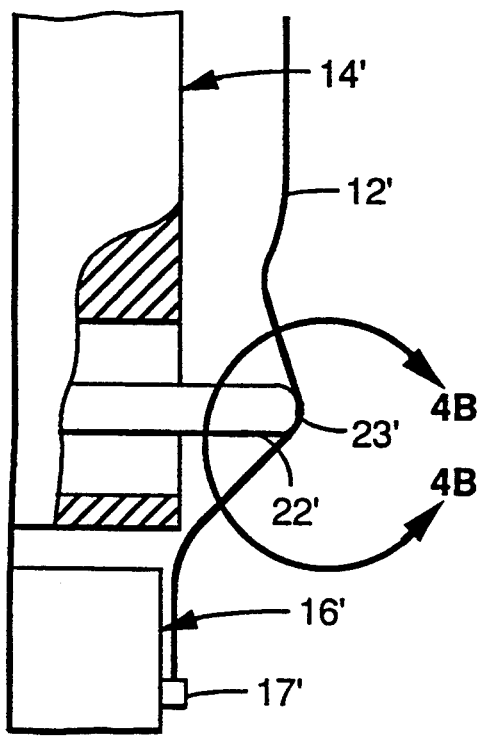
FIG. 4A is a vertical section of the prior art assembly of FIG. 3 taken at a location near the point 26' where the head enters the scan of the tape 12' helically transported about the assembly 10'.
Figure 4B:
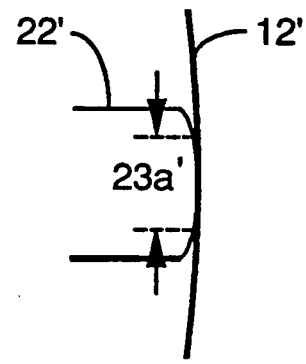
FIG. 4B is an expanded view of the head and tape of FIG. 4A at the location circumscribed by the line 4B—4B.

A better appreciation of the improvement resulting from the apparatus of this invention is obtained through a better understanding of the head-to-tape interface problem caused by the varying thickness of the air film established between the tape 12' and cylindrical drum tape guide sections 14' and 16'. FIGS. 4A/4B, 5A/5B and 6A/6B depict the poor head tip penetration characteristic of the head-to-tape interface provided by the prior art cylindrical drum tape guide assembly of FIG. 3 from the start of the scan of the tape 12' by a head 22' (FIGS. 4A/4B) to the end of the tape scan by the head (FIGS. 6A/6B). In the embodiment illustrated in FIGS. 3–6, the magnetic head 22' has a non-magnetic gap at its tip 23' that effects the recording and/or reproducing of information relative to the tape 12'. The non-magnetic gap is defined by opposing, spaced apart faces of a pair of pole members, which in FIGS. 4–6 are aligned with the pole faces lying in planes parallel to the plane of FIGS. 4–6 and spaced apart in the direction of view of the figures. Hence, the width of the non-magnetic gap at the tip 23' of the head 22', which defines the width of the active transducing region 23a' of the head 22' (FIGS. 4B, 5B and 6B) and the width of the tracks of information along the tape 12' lies in the plane of the tape and extends vertically in FIGS. 4–6.

Referring to FIG. 4A, at the start of the scan of the tape 12' by a head 22', tip 23' of head 22' creates a slight lift or tent in tape 12' at the point where tape 12' passes over head tip 23'. FIG. 4B is an enlarged view of the region of head tip 23' and tape 12' shown in FIG. 4A showing tape 12' lying against the active transducing region 23a' of head 22'. At the start of the scan, shown by FIG. 4B, tape 12' has little contour, because the thickness of the air film established between the tape 12' and the surface of the scanner 10' provides the support of the tape, and the head creates only a slight lift to the tape. Consequently, most of the active transducing region 23a') of the head 22' is contacted by the tape 12'. Refer to FIG. 5A, which illustrates the head-to-tape interface at the approximate midpoint 21' of the scan of the tape 12' by the head 22'. At this point in the scan of the tape 12', the thickness of the air film between tape 12' and drums 14' and 16' has been reduced by the various previously described effects that cause a loss of air from the air film established between the tape 12' and the cylindrical drum tape guide assembly 10'. This results in the contour of the tent of the tape 12' closely conforming to the contour of the tip 23' of the head 22'. This is the preferred head-to-tape interface that is seen in FIG. 5B, which is an enlarged view of head tip 23' and tape 12' shown in FIG. 5A. As the thickness of this air film is reduced further, lateral curvature of tape 12' relative to the head tip 23' occurs. And, at or near the end of the scan, shown by FIG. 6A, a large reduction in the thickness of the air film between tape 12' and the drums 14' and 16' occurs, and excessive lateral curvature of the tape 12' relative to the head tip 23' results. The restfit of this excessive relative curvature is seen in FIG. 6B, which is an enlarged view of head tip 23' and tape 12' shown in FIG. 6A. At this point in the tape path about the rotary magnetic head and cylindrical tape guide assembly 10', the lateral curvature of tape 12' increases to the point where a physical gap is created between tip 23' and tape 12' at the very center of the width of the head 2'. The loss of contact that results from this gap causes a corresponding drop of output signal level and signal-to-noise ratio.

In the prior art helical scan rotary magnetic head and cylindrical tape guide assembly 10' illustrated in FIGS. 3–6, it is seen that the two cylindrical drum tape guide sections 14' and 16' are coaxially aligned, with the upper rotatable drum section 14' having a larger radius than the lower stationary cylindrical drum section 16'. This construction of the two cylindrical drum sections creates the desired downward forces that act on the tape 12' as it is transported about assembly 10' to bias the tape 12' against the tape edge guide band 17' extending helically about the perimeter of the lower stationary cylindrical drum section 16', whereby the tape 12' is transported about the assembly 10' with the required precise guidance. As previously described, some rotary head helical scan tape record and/or reproduce apparatus have employed a magnetic head and cylindrical tape guide assembly having non-coaxial stationary and rotatable cylindrical drum tape guide sections, with the axis of the stationary section displaced a small amount relative to the axis of the rotatable section in the radial direction towards the location where the head exits the scan of the tape, in an attempt to reduce the drop in the signal output level to an acceptable level, without losing stability of tape guidance about the cylindrical drum tape guide. However, as previously discussed, in rotary head helical scan tape record and/or reproduce apparatus for digital signals it has not been possible to displace the stationary guide section a sufficient amount to remove all undesirable loss in output signal level without introducing some degree of undesirable instability in the guidance of the tape about the cylindrical drum tape guide assembly.

Figure 7:
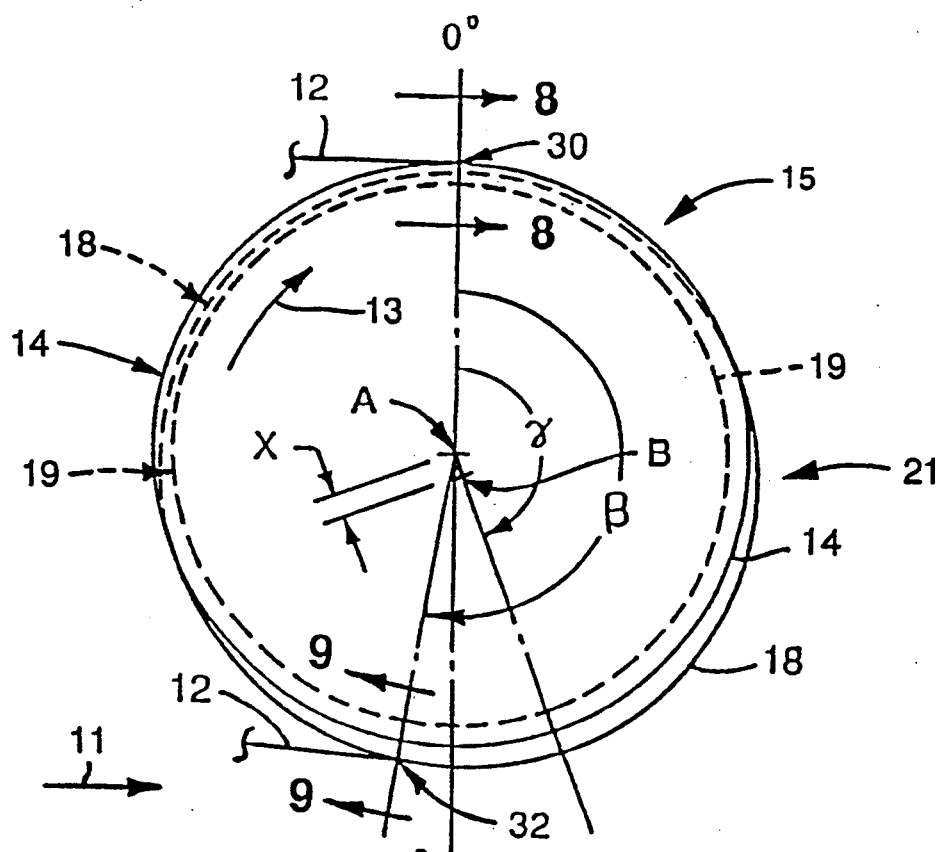
FIG. 7 is a top plan view of an embodiment of the helical scan rotary magnetic head and cylindrical tape guide assembly of the present invention.
Figure 8:
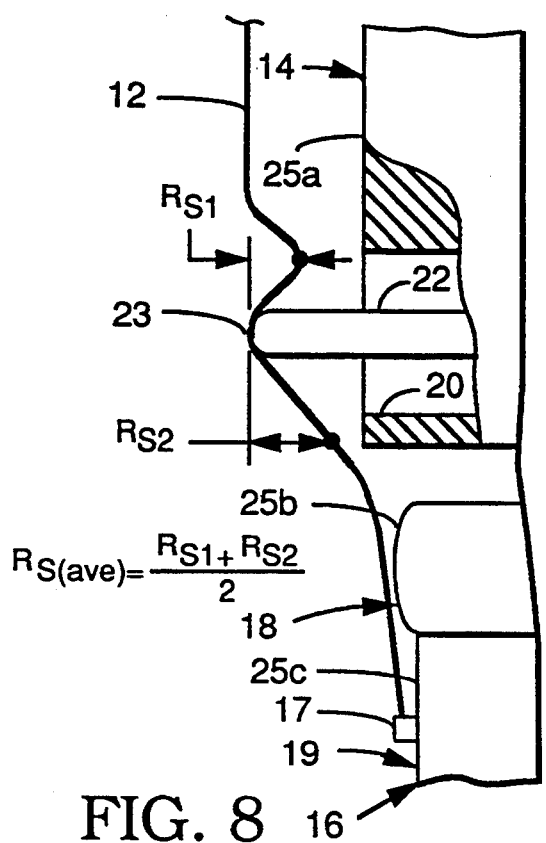
FIG. 8 is a vertical section taken generally on the line 8—8 of FIG. 7.
Figure 9:
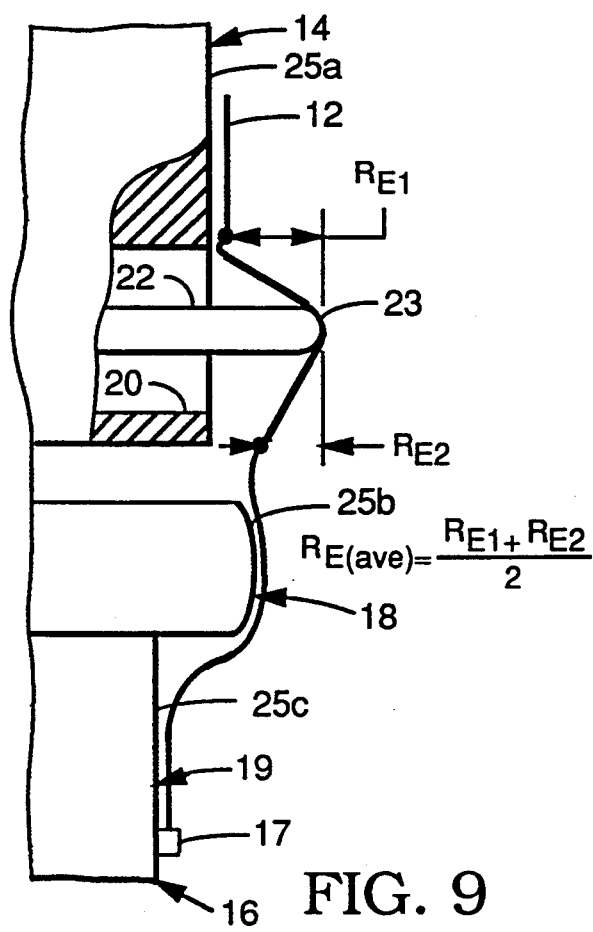
FIG. 9 is a vertical section taken generally on the line 9—9 of FIG. 7.

The improvement in the scanner structure to ameliorate this degradation of head-to-tape interface is depicted in FIGS. 7–10. FIGS. 8 and 9 depict the configuration assumed by the tape 12 over an upper rotatable drum section 14 and stationary lower drum section 16, which includes two non-coaxial segments 18 and 19, as the tape 12 is transported about the rotary magnetic head and cylindrical tape guide assembly 10. FIG. 8 illustrates the tape configuration near the location where the head 22 begins the scan of the tape 12, i.e., close to the point otherwise referred to as the head entry point 26 located at the tape exit tangent line 30 (FIG. 1). FIG. 9 illustrates the tape configuration near the end of scan of the tape 12 by head 22, i.e., close to head exit point 28 located at the exit tangent line 32 (FIG. 1). At the location where the head 22 begins the scan of the tape 12, most of the tape overlaps the upper rotating drum section 14 while a small portion of the tape overlaps the upper segment 18 of the lower stationary drum section 16 at the edge of stationary lower drum section proximate the rotary head 22. Although both portions of the tape that are over the drum sections 14 and 16 are separated by an air film, the portion of tape 12 over upper rotatable drum section 14 is displaced a greater distance from the cylindrical surface 25a defined by the drum section 14 about its central axis of rotation at "A" as a result of the thicker air film developed in this region. As the head 22 commences its scan of the tape 12, tip 23 of head 22 that projects through the drum window 20 beyond the cylindrical surface 25a of the drum section 14 creates a slight lift or tent in tape 12 at the interface between the tape 12 and the head tip 23. This lift or tent results in an average radial penetration "$R_{S(ave)}$" of head tip 23 into tape 12 of $$R_{S(ave)} = \frac{R_{s1} + R_{s2}}{2}$$

$R_{s1}$ = the relative penetration of the head tip 23 into the tape 12 on the upper drum section 14 side of head 22 at the beginning of the scan of the tape 12, and $R_{s2}$ = the relative penetration of the head tip 23 into the tape 12 on the lower drum section 16 side of head 22 at the beginning of the scan of the tape 12.

The slight depression or notch on the upper drum section 14 side of the head 22 is caused by the loss of air from the air film by bleeding through the window 20 provided in the upper rotatable drum 14 for the head 22. As the air film between the tape 12 and the cylindrical drum tape guide structure 15 dissipates towards the end of the head's scan of the tape 12, as shown in FIG. 9, this notch in the tape also dissipates.

As the head 22 proceeds through the scan of the tape 12, the thick air film between upper rotatable drum section 14 and tape 12 diminishes significantly along the scan as the result of leakage of air from the air film, such that at the end of the scan of the tape 12 by the head 22, as shown in FIG. 9, tape 12 is displaced from the surface 25a of the upper rotatable drum 14 a much lesser distance than at the beginning of the head's scan of the tape. Also, the axial location of the tape 12 relative to the cylindrical surfaces 25a, 25b and 25c defined by the two cylindrical drum tape guide sections 14 and 16 shifts due to the helical path followed by the tape about the cylindrical drum tape guide structure 15 to reside mostly over the lower stationary drum section 16 and only slightly over the upper rotatable drum section 14. Thus, at the end of the scan of the tape 12 by the head 22, head tip 23 lifts tape 12 a greater distance on the upper drum section 14 side of head 22 than at the start of scan (i.e., $R_{E1} > R_{S1}$). At the mid-point 21 of the scan of the tape by the head 22, the head tip 23 lifts tape 12 about the same distance on both sides of the head 22. With, however, upper segment 18 of the stationary lower drum section 16 radially displaced or offset from the centerline (axis "A") of the coaxial upper drum section 14 and lower drum segment 19 of the drum section 16 in the region where the head 22 ends its scan of the tape 12, tape 12 is maintained radially farther out from the axis "A". As a result, tape 12 is held radially outward by upper drum segment 18 so that the lift on the lower drum-section 16 is not as great as at the beginning of the head's scan of the tape 12, (i.e., $R_{E2} < R_{S2}$). In this manner, the radial penetration of head tip 23 "$R_{E(ave)}$" into tape 12 at the end of the tape scan will be substantially equal to the "$R_{S(ave)}$" radial penetration of head tip 23 at the start of the tape scan [i.e., $R_{E(ave)} \approx R_{S(ave)}$]. Furthermore, the offset drum segment 18 has the beneficial effect of maintaining the lateral curvature of tent in the tape 12 at the head tip 23 approximately the same at the start of the head's scan of the tape 12 as it is at the end of the scan of the tape 12, as shown in FIGS. 8 and 9.

The relationship of the axes and relative dimensions of upper rotatable drum section 14, the lower segment 19 of the lower stationary drum section 16, and the upper segment 18 of the lower stationary drum section 16 is best illustrated in FIG. 7. Point "A" identifies the centerline or central axis of the cylindrical surfaces 25a and 25c defined by the coaxial rotatable upper drum section 14 and the lower segment 19 of the lower stationary drum 16, while point "B" is the centerline or central axis of the cylindrical surface 25b defined by the offset upper segment 18 of the lower drum section 16. For stability and accuracy of guidance of the tape about the cylindrical tape guide assembly 10, the diameter of the upper rotatable drum section 14 is greater than the diameter of lower segment 19 of the lower stationary drum section 16. For purposes of defining the angular relationships, the head scan entry point 26 at the tape exit tangent line 30 is chosen as zero degrees. Relative to this entry point 26, the head scan exit point 28 at the tape entry tangent line 32 is displaced in the direction of the rotation of the head 22 (which is clockwise in the embodiments illustrated in FIGS. 7-10 an angle "$\beta$" of approximately 188°. The centerline or central axis of the radially offset upper segment 18 of the lower drum section 16 is radially displaced a distance "X" an angle of "$\gamma$" from the head scan entry point 26 in the direction of the rotation of the head 22 (which also is clockwise in the embodiments illustrated in FIGS. 7-10).

The upper drum segment 18 of the stationary drum section 16 closest to the juxtaposed rotary magnetic head 22 extends along its axis for a length which is smaller than the length of the other non-coaxial lower drum segment 19 of the stationary drum tape guide section 16, and forms a small ridge member about the stationary drum tape guide section. The two drum segments 18 and 19 can be integral members forming a single piece stationary drum tape guide section 16. Alternatively, the two drum segments 18 and 19 can be separate pieces secured against movement relative to each other by a suitable fastening device. In any event, the drum segment 18 is displaced radially relative to the drum segment 19 to act locally near the tip 23 of the rotary head 22 as the head scans the tape 12 where the air film thickness decreases to aid in supporting the tape at a greater elevation above the cylindrical surface 25a, 25b. 25c defined by the cylindrical drum tape guide structure 15 than the air film would do alone. In accordance with the present invention, the amount and direction of the radial displacement or offset of the axes of the drum segments 18 and 19 and the relative axial lengths of the drum segments are selected to maintain, at least locally near the tip 23 of the rotary head 22, an average depth of head penetration of the tape 12 generally uniform at least at the locations where the head 22 enters and exits the scan of the tape and at the midpoint 21 of the head's scan of the tape 12. Moreover, these parameters are selected to maintain the desired downward force on the tape 12 as it is transported about the rotary head and cylindrical drum tape guide 10 to bias the tape against the tape edge guide band 17 provided on the stationary cylindrical drum tape guide section 16.

For clarity of illustration in the drawings, the differences in diameters between upper rotatable drum 14 and the lower drum segment 19 of the lower stationary drum section 16 and the offset or displacement of the axis "B" for ridge member 18 of the drum section 16 are greatly exaggerated. In actual practice of one preferred embodiment constructed in accordance with the present invention, the offset or displacement dimension "X" was on the order of about 0.017 millimeters (mm) and the lower drum ridge member 18 had a diameter on the order of about 0.024 mm greater than the diameter of the lower segment 19 of the lower stationary drum section 16. The angle "γ" is on the order of between 140° to 170° (in one embodiment, about 159°) such that the radial offset of the ridge member 18 is generally in front of the head exit point 28 at the end of head's scan of the tape 12. The particular length of the ridge member 18 is selected relative to the axial length of the lower drum segment 19 so that the net forces that act on the tape 12 as it is transported about the rotary head and cylindrical drum tape guide assembly 10 bias the tape stably at the tape edge band guide 17. The length of interest in respect of the lower drum segment 19 is that from the bottom of the ridge member 18 to the top of the edge band guide 17 at the location of the head scan exit point 28. This axial length is determined by the width of the tape for which the rotary head and cylindrical drum tape guide 10 is constructed, and will be slightly smaller than the width of the tape 12. In respect of the radially offset ridge member 18 in the direction of its axis, B, preferably it is on the order of 1% to 15% of the width of tape 12. In one preferred embodiment constructed for a tape 12 having a width of 19 mm, the upper radially offset drum segment 18 had an axial length on the order of about 1.3 mm, and the lower drum segment 19 had an axial length from the bottom of the ridge member 18 to the top edge of the guide 17 at the head scan exit point 28 on the order of about 14.7 mm.

Figure 10:
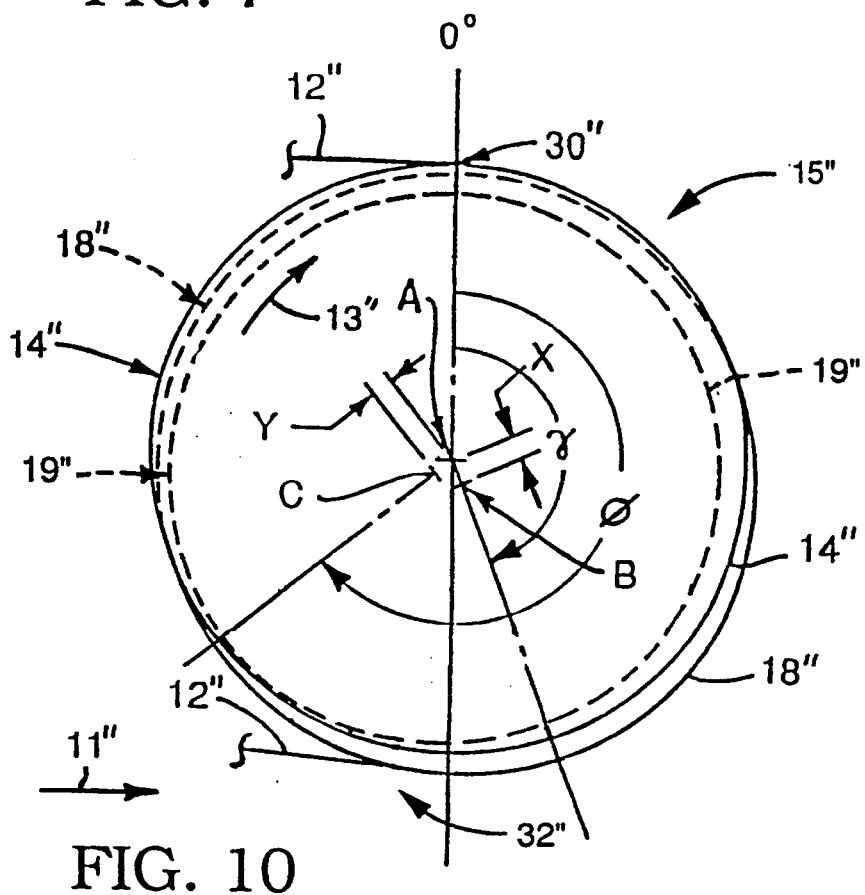
FIG. 10 is a top plan view of another embodiment of the helical scan rotary magnetic head and cylindrical tape guide assembly of the present invention.

In the alternative embodiment of the apparatus of the present invention illustrated in FIG. 10, the upper rotatable drum section 14" and the lower drum segment 19" of the lower stationary drum section 16" are not coaxial, but are instead axially displaced. Point "A" represents the centerline or central axis about which the upper drum 14" rotates, with lower ridge member 18" displaced generally in the same manner as in the embodiment of FIG. 7, namely a distance "X" along a radial line at an angle "γ" in a clockwise direction from head scan entry point at the tape entry tangent line 30". The centerline or central axis "C" of the lower drum segment 19" of the lower stationary drum section 16" is, however, displaced a distance "Y" along a radial line at an angle "φ" from the head entry tangent line 30" in the direction of the rotation of the head 22, or clockwise. For an embodiment of a helical scan tape record and/or reproduce apparatus constructed according to either of the well known D-1 or D-2 formats, the angle "φ" is normally approximately 230° with the distance "Y" on the same order as the distance "X". For helical scan tape record and/or reproduce apparatus constructed according to other formats or having cylindrical drum tape guide assemblies with different rotary head and drum tape guide arrangements, however, a different direction and amount of displacement of the lower drum segment 19" may be needed to achieve the desired accuracy and stability of tape guidance about the rotary head and cylindrical drum tape guide assembly 10".

As has been described, ridge member 18" acts locally near the head tip in the vicinity of the end of scan of the tape 12" to help support the tape 12" where the thickness of the air film established between the tape 12" and the cylindrical surface defined by the drum tape guide structure 15" has decreased and thereby provides a more uniform average effective tip penetration throughout the scan of the tape by the head. As described hereinbefore, this eliminates the undesirable tapered decrease of the output signal as the head scans the tape 12" from the beginning to the end of the tape scan. To obtain accuracy and stability of the guidance of the tape 12" about the cylindrical drum tape guide assembly, the drum segment 19" of the lower drum section 16" is slightly smaller in diameter than either the rotatable upper drum section 14"" or the radially offset ridge member 18". Furthermore, the drum segment 19" also extends along its axis for a length that is much longer than the corresponding length of the ridge member 18" so that the area of tape 12" in contact with the drum segment 19", where the radial distance to the facing surface of the tape 12" is smaller than at the upper rotatable drum section 14", is much larger than the area of tape 12" in contact with ridge member 18", where the radial distance to the facing surface of the tape 12" is larger than at either the upper rotatable drum section 14" or at the drum segment 19". As a result of these relationships, the net forces acting on the tape 12" as it is transported about the rotary head and cylindrical drum tape guide assembly 10" bias the tape stably about the guide assembly.

Simply offsetting the axis of the stationary lower drum section 16" from the axis of the rotatable upper drum section 14", without providing the stationary lower drum section 16" with the ridge member 18" radially offset in the direction generally towards the head exit point at the head exit tangent line 30", will result in a substantial length of the scan of the tape 12" by the rotary head where the effective radius (size plus air film) of the lower drum section 16" is larger than the effective radius of the upper rotatable drum section 14". As described previously, this condition can produce forces that act on the tape 12" as it is transported about the rotary head and cylindrical drum tape guide assembly 10" that render the guidance of the tape about the drum assembly undesirably unstable and inaccurate. This is particularly the case in rotary head helical scan tape record and/or reproduce apparatus constructed according to either the well known D-1 or D-2 formats having narrow tracks of recorded information recorded and reproduced at high relative head-to-tape speeds. Thus, while the provision of the radially offset ridge member 18" on the stationary lower drum section 16" provides the advantages of a more uniform and symmetric head tip penetration in cylindrical drum tape guide assemblies having either coaxial or non-coaxial upper and lower drums sections 14" and 16", embodiments of such assemblies having non-coaxial or offset upper and lower drum sections 14" and 16" with the offset ridge member 18" on the stationary lower drum section 16" have the additional advantages of assuring a more stable and accurate guidance of the tape about the guide assembly.

It will be appreciated from the foregoing description of various embodiments that the apparatus of the present invention enables the establishment of a more uniform and symmetric head tip penetration relative to the surface of a tape transported about a helical scan rotary magnetic head and cylindrical drum tape guide assembly. Moreover, such head tip penetration can be achieved without risking the loss of stability and accuracy of tape guidance about the guide assembly. While preferred embodiments of the apparatus of the present invention have been described in detail in relation to guide assemblies having particular configurations, it will be readily apparent to those having familiarity with the pertinent technology that the apparatus of the present invention can be embodied in other forms without departing from the spirit or essential characteristics of the present invention.

For example, the rotary head and cylindrical drum tape guide assembly can be constructed with a pair of axially displaced stationary drum guide sections with the rotary head mounted to a separate rotatable structure located between the pair of stationary drum sections. In such embodiments, the radially offset drum segment is preferably located at the end of the stationary drum guide section that is closest to the rotary head. However, in embodiments having stationary drum guide sections of different diameters, the radially offset drum segment is preferably located at the end of the stationary drum guide section of smallest diameter, even if the rotary head is located closer to the other guide section. Furthermore, in rotary head and cylindrical drum tape guide assembly embodiments having stationary and rotatable drum guide sections, the stationary drum guide section can be located above as well as below the rotatable drum guide section as in the embodiments illustrated in the drawings. Regardless of the particular embodiment of the apparatus of the present invention, it makes no difference which direction the head or heads rotate, which direction the tape is transported about the cylindrical drum tape guide assembly, whether the tape follows a half-wrap, full-wrap or other degree of wrap, or whether the tape enters the path about the drum guide assembly above or below where it exits the path. However, the selections from these alternatives are made to provide a stable transport of the tape and an optimum signal transfer between the tape and the record and/or reproduce apparatus.

In any embodiment of the apparatus of the present invention, the dimensions of the radially displaced or offset drum segment or segments relative to those of the other parts of the cylindrical drum tape guide, the direction of the offset and the amount of the offset are preferably selected to obtain, locally near the tip of the rotary head, the most generally uniform average depth of head penetration of the tape at least at three locations of the scan of the tape by the rotary head. These three locations are where the rotary head enters the scan of the tape, where the rotary head exits the scan of the tape and at the location of the head's scan of the tape midway between where the head enters and exits the scan of the tape. These parameters can vary widely for different rotary head and cylindrical drum tape guide assembly embodiments, but are readily determinable empirically for any assembly embodiment. If desired, more than one offset drum segment can be used to achieve the desired generally uniform average depth of head penetration of the tape, with the dimensions, the amount of offset and/or the direction of offset selected as needed. When more than one offset drum segment is employed, the axial length and the direction and amount of radial displacement of each offset segment are selected to provide stable and accurate guidance of the tape about the rotary head and cylindrical drum tape guide assembly with the average depth of head penetration of the tape being generally uniform at the locations where the rotary head enters and exists the scan of the tape and at the location midway therebetween.

The presently disclosed embodiments are therefore considered in all respects to be illustrative and not restrictive. The scope of the invention is indicated by the following claims rather than the foregoing description, and all changes that come within the meaning and range of equivalents thereof are intended to be embraced therein.

What is claimed is:

1. A rotary head and cylindrical drum tape guide assembly for a rotary head magentic tape record and/or reproduce apparatus defining a helical path for a magnetic tape, comprising:

a cylindrical drum structure defining a surface for guiding the magnetic tape along the helical path from a location where magnetic head begins the scan of said magnetic tape to a location where said magnetic head ends the scan of said magnetic tape, said cylindrical drum structure including a first stationary cylindrical drum defining a cylindrical surface about a central axis;

at least one magnetic head mounted for rotation proximate to an end of said first stationary cylindrical drum, said magnetic head having a tip projecting radially outward from the surface defined by said cylindrical drum structure for transferring signals with said magnetic tape guided along said helical path; and at least a second stationary cylindrical drum mounted between said end of said first stationary cylindrical drum and said magnetic head and defining a cylindrical surface about a central axis, said second stationary cylindrical drum mounted with its central axis displaced radially from the central axis of said first cylindrical drum in a direction towards the location where said magnetic head ends the scan of the tape to displace its cylindrical surface radially outward from the cylindrical surface of said first stationary cylindrical drum near the location where said magnetic head ends the scan of the tape.

2. The assembly of claim 1 wherein the tip of the magnetic head projects radially outward from the surface defined by the cylindrical drum structure to displace the magnetic tape away from said surface about said tip as said magnetic head scans said magnetic tape, and the central axis of the second stationary cylindrical drum is displaced radially from the central axis of the first stationary cylindrical drum in a direction and by an amount selected to displaced said magnetic tape away from said surface about said tip whereby said tip penetrates said magnetic tape substantially to the same average depth at least at the locations where said magnetic head beings and ends the scan of said magnetic tape and midway between where said magnetic head begins and ends said scan.

3. The assembly of claim 2 wherein each of the first and the second stationary cylindrical drums defines a length in the direction of its central axis, and the lengths of said first and second stationary cylindrical drums are selected to provide stable guidance of the magnetic tape along the helical path.

4. The assembly of claim 3 wherein the cylindrical drum structure includes a cylindrical drum section mounted about a central axis proximate the second stationary cylindrical drum distal the first startionary cylindrical drum, and said first stationary cylindrical drum is mounted with its central axis displaced radially from the central axis of said cylindrical drum section in a direction and by an amount selected to provide stable guidance of the magnetic tape along the helical path.

5. The assembly of claim 4 wherein the cylindrical drum section is mounted for rotation about its central axis, and the magnetic head is supported by said cylindrical drum section for rotation therewith.

6. The assembly of claim 1 wherein each of the first and the second stationary cylindrical drums defines a length in the direction of its central axis, and the lengths of said first and second stationary cylindrical drum segments are selected to provide stable guidance of the magnetic tape along the helical path.

7. The assembly of claim 6 wherein the cylindrical drum structure includes a cylindrical drum section mounted about a central axis proximate the second stationary cylindrical drum distal the first stationary cylindrical drum, and said axis stationary cylindrical drum is mounted with its central axis displaced radially from the central axis of said cylindrical drum section in a direction and by an amount selected to provide stable guidance of the magnetic tape along the helical path.

8. The assembly of claim 7 wherein the cylindrical drum section is mounted for rotation about its central axis, and the magnetic head is supported by said cylindrical drum section for rotation therewith.

9. A rotary head and cylindrical drum tape guide assembly for a rotary head magnetic tape record and/or reproduce apparatus defining a helical path for a magnetic tape, comprising:

a cylindrical drum structure defining a surface for guiding the magnetic tape along the helical path from a location where a magnetic head beings the scan of said magnetic tape to a location where said magnetic head ends the scan of said magnetic tape, said cylindrical drum structure including first stationary cylindrical drum defining a cylindrical surface about a central axis;

at least one magnetic head mounted for rotation proximate to an end of said first stationary cylindrical drum, said magnetic head having a tip projecting radially outward from the surface defined by said cylindrical drum structure for transferring signals with said magnetic tape guided along said helical path; and at least one second stationary cylindrical drum mounted about a central axis between said end of said first stationary cylindrical drum and said magnetic head, each said second stationary cylindrical drum mounted with its central axis displaced radially from the central axis of said first stationary cylindrical drum to define a cylindrical surface that has a length in the direction of its central axis and that is displaced radially outward from the surface of said first stationary cylindrical drum, the length of each second stationary cylindrical drum and the direction and amount of radial displacement of the central axis of each second stationary cylindrical drum are selected to provide stable guidance of said magnetic tape along the helical path and to produce a depth of penetration of said magnetic tape by said tip that is substantially the same at least at the locations where said magnetic head begins and ends the scan of said magnetic tape and midway between where said magnetic head begins and ends said scan.

10. A rotary head and cylindrical drum tape guide assembly for a rotary head magnetic tape record and/or reproduce apparatus defining a helical path for a magnetic tape, comprising:

a stationary cylindrical drum defining a cylindrical surface about a central axis;

a rotatable cylindrical drum mounted juxtaposed the stationary cylindrical drum and defining an axis of rotation extending in the direction of the central axis of said stationary cylindrical drum;

at least one magnetic head mounted at the periphery of said rotatable cylindrical drum juxtaposed the stationary cylindrical drum, said magnetic head having a tip projecting from the periphery of said rotatable cylindrical drum for transferring signals with magnetic tape guided about said stationary and rotatable cylindrical drums;

a tape guide member defining a helical path for magnetic tape about said stationary and rotatable cylindrical drums from a location where said magnetic head begins the scan of said magnetic tape to a location where said magnetic head ends its scan of said magnetic tape; and at least one stationary cylindrical ridge member mounted at one end of said stationary cylindrical drum juxtaposed to said magnetic head and having a surface in the form of a cylinder extending about an axis, each said stationary cylindrical ridge member mounted with its axis displaced radially from the central axis of said stationary cylindrical drum in a direction towards the location where said magnetic head ends its scan of the tape to displace its cylindrical surface radially outward from the cylindrical surface of said stationary cylindrical drum near the location where said magnetic head ends its scan of the tape.

11. The assembly of claim 10 wherein said rotatable cylindrical drum is mounted coaxial with said stationary cylindrical drum to rotate about the central axis of said stationary cylindrical drum.

12. The assembly of claim 10 wherein said stationary cylindrical drum is mounted with its central axis displaced radially from the axis of rotation of the rotatable cylindrical drum in a direction and by an amount selected to provide stable guidance of the magnetic tape along the helical path.

13. The assembly of claim 12 wherein the displacement of the central axis of the stationary cylindrical drum is in a direction away from the direction of the radial displacement of the axis of the cylindrical ridge member.

14. The assembly of claim 13 wherein the helical path along which the magnetic tape is guided extends near 180° about the stationary and rotatable cylindrical drums, and the axis of the cylindrical ridge member is displaced along a radius angularly displaced in the direction of rotation of the magnetic head between 140° and 170° from the location where the magnetic head begins its scan of said magnetic tape.

15. The assembly of claim 14 wherein the axis of the cylindrical ridge member is displaced along a radius angularly displaced in the direction of rotation of the magnetic head about 159° from the location where the magnetic head begins its scan of the magnetic tape.

16. The assembly of claim 15 wherein the axis of the cylindrical ridge member is displaced radially from the central axis of the stationary cylindrical drum about 0.017 mm and the diameter of said cylindrical ridge member is about 0.024 mm greater than the diameter of the stationary cylindrical drum.

17. The assembly of claim 13 wherein the cylindrical ridge member has a length in the direction of the central axis of the stationary cylindrical drum of between 1% and 15% of the width of the magnetic tape transported along the helical path.

18. The scanner of claim 17 wherein the length of the cylindrical ridge member is about 1.3 mm.

19. The assembly of claim 10 wherein the tape guide member defines a a helical path for magnetic tape about the stationary and rotatable cylindrical drums of near 180°, and the axis of the cylindrical ridge member is displaced along a radius angularly displaced in the direction of rotation of the magnetic head between 140° and 170° from the location where the magentic head begins its scan of said magnetic tape.

20. The assembly of claim 19 wherein the axis of the cylindrical ridge member is displaced along a radius angular displaced in the direction of rotation of the magentic head about 159° from the location at which the magnetic head begins its scan of the magnetic tape.

21. The assembly of claim 20 wherein the axis of the cylindrical ridge member is displaced radially from the central axis of the stationary cylindrical drum about 0.017 mm and the diameter of said cylindrical ridge member is about 0.024 mm greater than the diameter of the stationary cylindrical drum.

22. The assembly of claim 21 wherein the cylindrical ridge member has a length in the direction of the central axis of the stationary cylindrical drum of between 1% and 15% of the width of the magnetic tape transported along the helical path.

23. The assembly of claim 22 wherein the length of the cylindrical ridge member is about 1.3 mm.

24. The assembly of claim 10 having one stationary cylindrical ridge member and wherein said one stationary cylindrical ridge member is mounted with its axis displaced radially from the central axis of said stationary cylindrical drum along a radius that extends in a direction towards the helical path and that is located between the locations where said magnetic head begins and ends its scan of said magnetic tape.

25. A rotary head and cylindrical drum tape guide assembly for a rotary head magnetic tape record and/or reproduce apparatus defining a helical path for a magnetic tape, comprising:
a stationary cylindrical drum defining a cylindrical surface about a central axis;
a rotatable cylindrical drum mounted above and juxtaposed the stationary cylindrical drum, said rotatable cylindrical drum defining an axis of rotation extending in the direction of the central axis of said stationary cylindrical drum;
a plurality of magnetic heads mounted at the periphery of said rotatable cylindrical drum juxtaposed said stationary cylindrical drum, each of said magnetic heads having a tip projecting from the periphery of said rotatable cylindrical drum for transferring signals with magnetic tape guided about said stationary and rotatable cylindrical drum;
a plurality of tape guide members defining a helical path for magnetic tape about said stationary and rotatable cylindrical drums of near 180° from a location where said magnetic heads begin the scan of said magnetic tape to a location where said magnetic heads end the scan of said magnetic tape; and
at least one stationary cylindrical ridge member mounted at one end of said stationary cylindrical drum juxtaposed to said magnetic heads and having a surface in the form of a cylinder extending about an axis, each said cylindrical ridge member having a length in the direction of the central axis of between 1% and 115% of the width of said magnetic tape transported along said helical path and mounted with its axis displaced from said central axis of said stationary cylindrical drum in a direction along a radius angularly displaced in the direction of rotation of said magnetic heads between 140° and 170° from the location where said magnetic heads begin the scan of the tape to displace its cylindrical surface radially outward from said cylindrical surface of said stationary cylindrical drum near the location where said magnetic heads end the scan of said magnetic tape.

26. The assembly of claim 25 wherein the rotatable cylindrical drum is mounted coaxial with the stationary cylindrical drum to rotate about the central axis of said stationary cylindrical drum.

27. The assembly of claim 25 wherein the stationary cylindrical drum is mounted with its central axis displaced radially from the axis of rotation of the rotatable cylindrical drum in a direction and by an amount to provide stable guidance of the magnetic tape along the helical path.

28. A rotary head and cylindrical drum tape guide assembly for a rotary head magnetic tape record and/or reproduce apparatus defining a helical path for a magnetic tape, comprising:
a cylindrical drum structure defining a surface for guiding the magnetic tape along the helical path from a location where a magnetic head begins the scan of said magnetic tape to a location where said magnetic head ends the scan of said magnetic tape, said cylindrical drum structure including a stationary cylindrical drum defining a cylindrical surface about a central axis;
at least one magnetic head mounted for rotation proximate to an end of said stationary cylindrical drum, said magnetic head having a tip projecting radially outward from the surface defined by said cylindrical drum structure for transferring signals with said magnetic tape guided along said helical path; and
a stationary cylindrically shaped member mounted at one end of said stationary cylindrical drum juxtaposed to said magnetic head and defining a cylindrically shaped surface extending between said locations where said magnetic head begins and ends its scan of said magnetic tape, said stationary cylindrically shaped member mounted with its cylindrically shaped surface having its axis displaced radially from the central axis of said stationary cylindrical drum along a radius that extends in a direction towards the helical path and that is located between said locations where said magnetic head begins and ends its scan of said magnetic tape near the location where said magnetic head ends its scan of the tape to displace its cylindrically shaped surface radially outward from the cylindrical surface of said stationary cylindrical drum.

* * * * *